INVENTORS
Richard F. Novak and
Frank Zabroski
BY Donald P. Ellette
Their Attorney

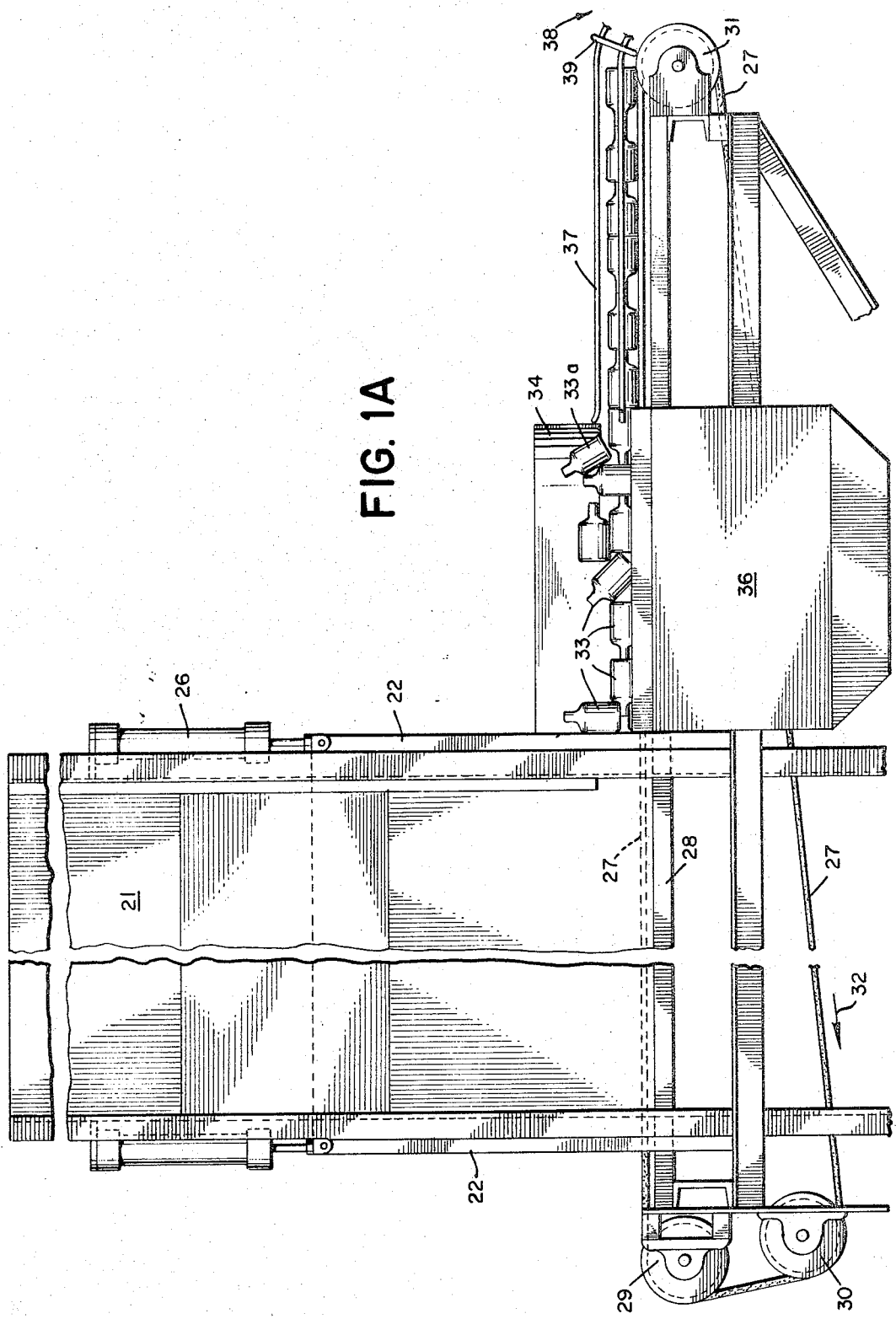

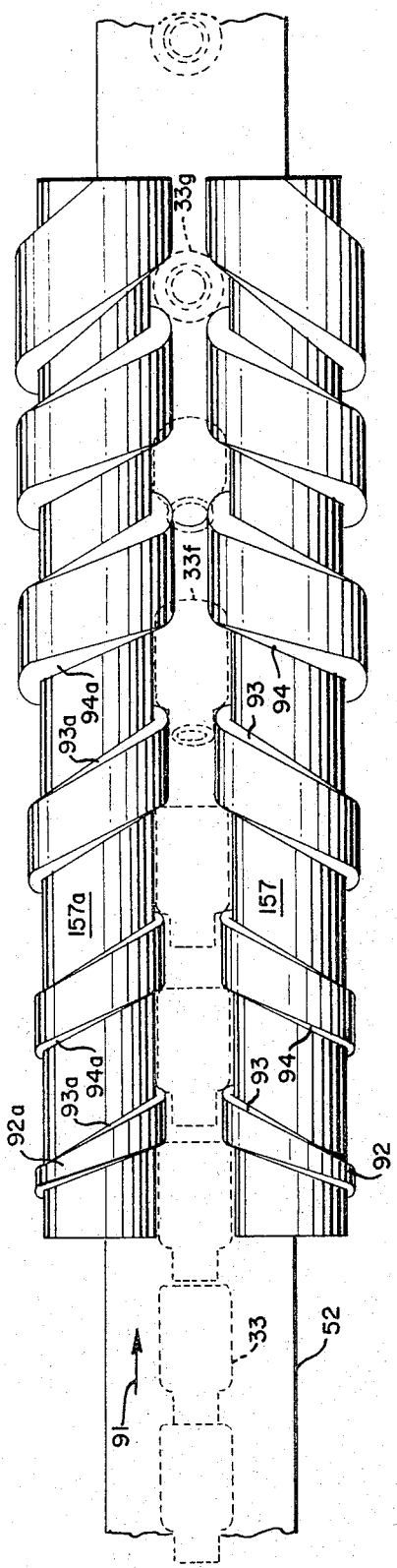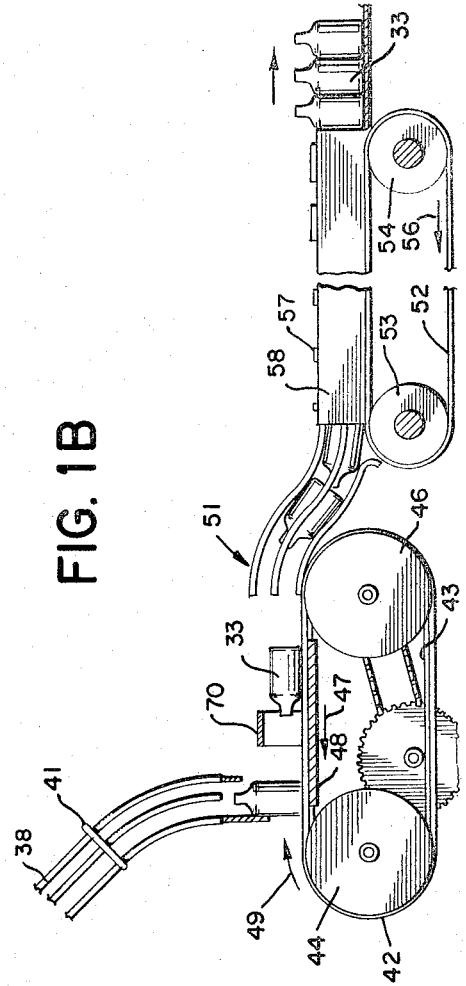

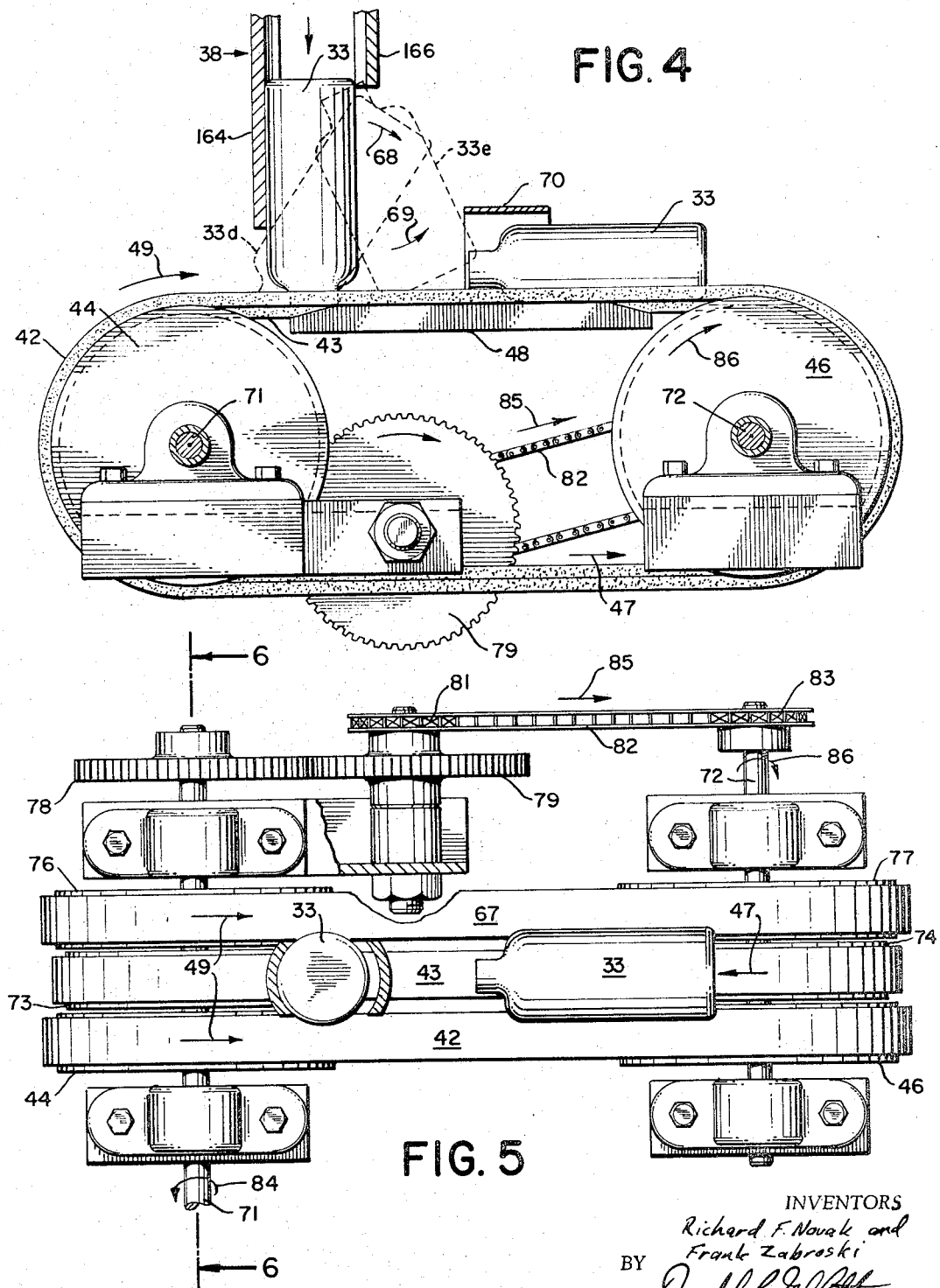

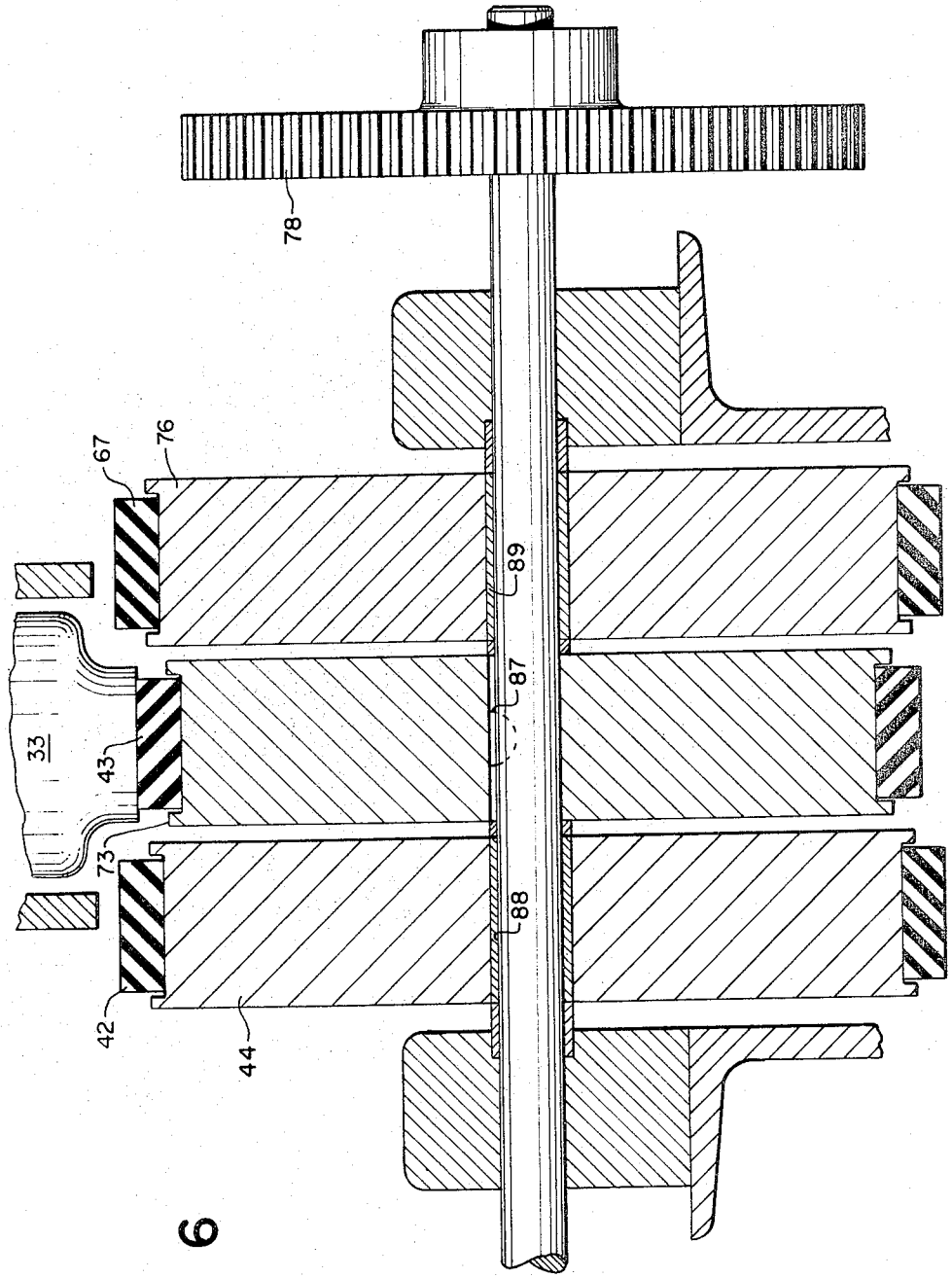

Sept. 5, 1967 R. F. NOVAK ETAL 3,339,702
DEVICE FOR ORIENTING BOTTLES
Filed Oct. 22, 1965 6 Sheets-Sheet 6

INVENTORS
Richard F. Novak and
Frank Zabroski
BY Donald P. Ellette
Their Attorney

United States Patent Office 3,339,702
Patented Sept. 5, 1967

3,339,702
DEVICE FOR ORIENTING BOTTLES
Richard F. Novak, High Bridge, and Frank Zabroski, Convent Station, N.J., assignors to Simautics, Inc., Hillside, N.J., a corporation of New Jersey
Filed Oct. 22, 1965, Ser. No. 502,117
10 Claims. (Cl. 198—33)

This invention relates to apparatus for receiving randomly oriented articles, such as bottles, and automatically aligning them. In particular the invention relates to apparatus for pre-aligning bottles first in one plane, then along one axis but with the necks of some of the bottles facing in one direction and the necks of others facing in the opposite direction, and further manipulating the bottles to force all of them into the same orientation with their necks all pointing in the same direction.

The use of plastic bottles is becoming increasingly widespread. Some of the principal reasons are that the bottles are less expensive, are virtually unbreakable and therefore easier to handle, and are much lighter than glass bottles of the same shape. The fragility of glass bottles makes it necessary to package them in sectioned containers, usually with one bottle per section. Such containers have the advantage of making it easy to insert the bottles into automatic loading machines because the alignment of the bottles is determined by the placement of the sections in the containers and this placement, being known in advance, can be accommodated by the machine. Plastic bottles, on the other hand, need not be placed in sectioned containers but may be shipped in unpartitioned containers without regard to the orientation of the bottles or their separation from each other. In order to use these randomly oriented bottles in automatic filling machines, it is necessary to align the bottles before they reach the filling stage of the machines. Alignment apparatus used heretofore has been extremely expensive or has had limited production rates, so low that several alignment machines have been required for each filling machine.

It is a principal object of the present invention to align randomly oriented bottles so that they all face exactly the same way ready to receive their contents or to be labeled or both.

Another object is to provide a hopper with pre-alignment means to receive randomly oriented bottles and align them all in one plane that includes the axis of each bottle.

A further object is to provide means to remove from a continuous flow of bottles aligned in one plane all those that do not occupy one of two converse orientations: neck facing in one direction or in the opposite direction.

Another object is to provide mechanism for receiving partially pre-aligned bottles, the necks of which face either in one direction or in the reverse direction, and re-orient the bottles as necessary to cause the necks of all of them to point in the same direction.

A still further object of this invention is to upend bottles disposed end to end with their necks all facing in the same direction to a position in which all the bottle necks point upwardly.

Further objects are to align bottles having many different shapes and to carry out the alignment procedures at a high rate of speed sufficient to permit one alignment machine to operate as the sole means for feeding bottles into one or more filling machines.

Still further objects will become apparent from the following specification together with the drawings in which:

FIGS. 1A and 1B show in side view the upper and lower portions of a complete bottle aligning machine incorporating the present invention;

FIG. 4 is a side view of alignment mechanism receiving a stream of bottles, all of which are aligned end to end but some of which have their necks facing in the opposite direction from that desired, and inverting the latter bottles as necessary to reorient them with their necks facing in the proper direction;

FIG. 5 is a top view of the apparatus in FIG. 4;

FIG. 6 is an end view of the apparatus in FIG. 4;

FIG. 7 shows a timing screw mechanism for upending the oriented bottles received from the mechanism of FIG. 4.

Figure 2:
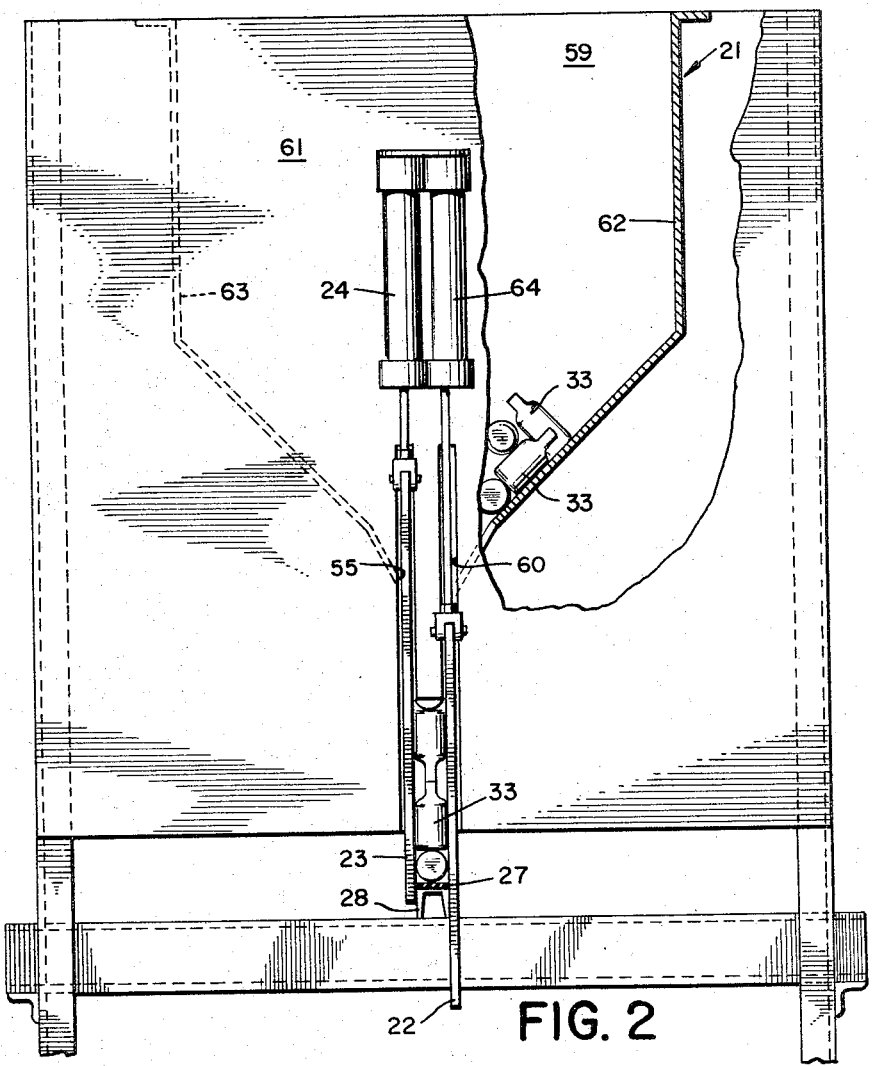
FIG. 2 is an end view of a hopper shown in FIG. 1.

The embodiment in FIG. 1 shows a hopper 21 into which the bottles to be aligned are dumped without any regard to orientation. The hopper is normally large enough to hold thousands of the bottles to be aligned and tapers down to an elongated slot at the bottom. The sides of this slot are defined by two panels 22 and 23 each slightly longer than the hopper 21 and arranged to slide vertically therein. Each of these panels is supported at each end by suitable power means, which in this embodiment are air cylinders 24 and 26 for the panel 23 and similar air cylinders (not shown) for the panel 22.

A conveyor belt 27 runs on a support member 28 in the space between the two panels 22 and 23. The belt 27 is carried on three drums 29–31 of which the drum 30 is vertically adjustable to take up slack in the belt and the drum 31 is driven by a motor (not shown) so that the belt moves in the direction indicated by the arrow 32.

Bottles 33 emerge from the hopper 21 only partially aligned, as shown. They are aligned to the extent that the same plane would pass through the center of all of the bottles but, they may be lying down facing in either direction or standing up facing either up or down or they may even be piled on top of each other. In order to align the bottles still more accurately, a deflector plate 34 is placed near the exit of the hopper. This plate is usually curved at the end remote from the hopper, and as the bottles reach the curved end, those that are standing up or that are resting on top of other bottles are brushed off, as is indicated by the bottle 33a, into a receptacle 36. The bottles may either be accumulated there and from time to time dumped back into the hopper 21, or they may be carried to the top of the hopper by conveyor means (not shown). The effect of the deflector plate 34 is to permit only those bottles that are lying down, either with their necks facing in the direction of travel or in the opposite direction to continue along the conveyor 27.

Directly after passing beneath the deflector plate 34, the bottles enter a tube 37 where they may be further oriented if they have non-circular cross-sections. The tube need not have solid walls as long as the bottles within it are sufficiently contained to prevent their reorientating themselves and as long as they are free to move without jamming up. The tube 37 leads directly into a chute 38 which may have solid walls or, as in the present embodiment, may be simply made of rods held together by clamping members 39 and 41. The chute 38 leads downwardly from the level belt 37 and at its exit end becomes vertical, or nearly so.

Beneath the exit end of the chute is a further aligning device, which, in the present embodiment consists of several endless belts and means to drive them. Only the belts 42 and 43 are shown and they are mounted on drums of which only the drums 44 and 46 appear in the drawing. The belt 43, which runs on a shorter track than the belt 42, moves in the direction indicated by the arrow 47. As will be described hereinafter, there is a belt of the same length as the belt 42, the other belt being directly behind the belt 42 in FIG. 1. These two belts run over shoes, of which only the shoe 48 is shown, and they travel in the direction of the arrow 49.

The bottles 33 are picked up, one after the other, by the outer belt 42 and the other belt hidden by it and are carried along to a receiving channel 51 which leads into a conveyor comprising a belt 52 mounted on drums 53 and 54, one of which is driven by a motor (not shown) to move the belt 52 in the direction of the arrow 56.

One side of the channel 51 consists of a timing screw 57 which is rotated on its axis by a suitable driving motor, such as the same motor that drives the belt 52. Timing screws are well-known in packaging machines for their ability to separate a train of contiguous, identical items, such as the bottles 33, so that there is a space of a definite length between bottles. This facilitates further processing of the bottles by making it easier to handle each one individually. The bottles are controlled by being caught between the convolutions of the timing screw 57 and an opposing wall 58. In the present invention, the convolutions of the timing screw are modified to cooperate with the channel wall 58 and the conveyor belt 52 so that the bottles 33 are not only properly spaced, but are rotated to an upright position as they emerge from the conveyor belt 52. The bottles are thus prepared for entry to a filling machine.

FIG. 2 shows a front view of the hopper 21 partly in cross-section to indicate some of the interior features. The hopper has two end walls 59 and 61 between which two sides 62 and 63 are attached. The bottom edges of these sides converge toward the two panels 22 and 23 which slide up and down in slots 55 and 60, respectively, in the end walls as the panels are alternately lifted and dropped by the air cylinders that provide the lifting force. In this figure the air cylinder 26 that lifts one end of the panel 23 is shown along with another air cylinder 64 that lifts one end of the other panel 23. The vertical height of the panels 22 and 23 is such that their bottom edges do not rise far enough to clear the belt 27 on which the bottles 33 ride. On the other hand, the tops of the panels extend up into the lower part of the hopper 21 so that as the panels are alternately lifted and dropped, they produce a tumbling action that agitates the bottles in the hopper to keep them from clogging the space between the panels and to make sure that enough of the bottles drop onto the belt 27 to keep the latter completely filled with bottles at all times as it emerges from the hopper.

Constructing the hopper in this way makes it a simple matter to arrange for bottles of different dimensions. All that need be changed to handle bottles of a different size is to use a different pair of end panels 59 and 61 with their slots 55 and 60 spaced either farther apart or closer together as necessary to accommodate the new bottles. If the bottles are not round in cross-section, that is if they have a width greater than their thickness, the slots 62 and 63 should preferably be spaced apart far enough to accommodate the thickness of the bottles but not their width.

Figure 3:
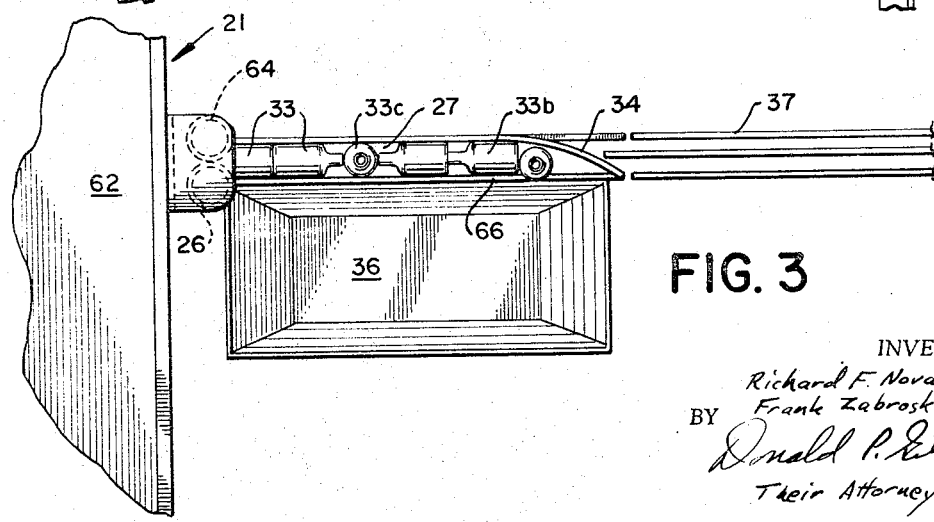
FIG. 3 shows a deflector as used in the apparatus of FIG. 1 for permitting only bottles that are aligned end to end to be carried further through the machine.

FIG. 3 shows a top view of one end of the hopper 21 to illustrate the arrangement of the deflector plate 34, which is located just outside of the hopper and extends generally parallel to the conveyor belt 27 for a short distance. Its end is bent over across the top of the conveyor belt so that the bottles 33 that are standing up as they reach this bent-over end are brushed off into the receptacle 36. As shown in FIG. 1, the lower edge of the deflector 34 is high enough to permit one bottle, but only one, to pass under and into tube 37. The guard rail 66 is located along side the belt 27 to keep bottles that are properly aligned along the belt 27 in the position of the bottle 33b in FIG. 3, from also being dragged off belt 27 along with other bottles that are standing up, as for example, the bottle 33c.

FIGS. 4–6 show in greater detail the apparatus for orienting the bottles so that all their necks point in one direction. The bottles come down the chute 38, which is shown here as comprising two curved members 164 and 166 in place of the separate round bars illustrated in FIG. 1. The members 164 and 166 are spaced apart far enough to permit the bottles 33 to slide easily in the passageway between them and yet to be securely held so that the bottles cannot fall out sideways. As may be seen in FIG. 4 the member 164 extends farther down than does the member 166 and forms an abutment. The distance between the abutment forming end of the member 164 and the belts is less than the height of the bottles and preferably less than the diameter of the bottles 33 to make it impossible for the bottles to be carried out from under the chute 38 in the wrong direction. The distance between the bottom end of the member 166 and the belts 42 and 67, which is shown in FIGS. 5 and 6, is less than the height of one of the bottles 33 from its bottom surface to the top of its neck, thus making it impossible for any of the bottles to travel along the belts 42 and 67 in an upright position.

The two possible orientations of the bottles 33 as they emerge at the bottom end of the chute 38 are shown in FIG. 4, one in dashed lines and identified as bottle 33d and the other in dot-and-dash lines and identified as bottle 33e. Bottle 33d has its neck facing downwardly and bottle 33e has its neck facing upwardly. As may be seen, the downwardly facing neck strikes the upper surface of the belt 43 before the main part or body of the bottle comes to rest upon the belts 42 and 67. Since the belt 43 is moving to the left in the direction of the arrow 47, the neck of the bottle 33d will be pulled to the left but the main portion of this bottle will be held back by the lower abutment end of the member 64, causing the bottle to tip in the direction of the arrow 68 to a reclining position in which it will be supported entirely by the belts 42 and 67 and will no longer touch the middle belt 43.

The other bottle 33e with the neck facing upwardly lands with its bottom on the belts 42 and 67 and does not touch the central and lower belt 43. As the belts 42 and 67 carry the bottle 33e to the right, the neck of this bottle will strike the end of the member 66, the bottle will be tipped over in the direction of the arrow 69 until it comes to rest in a reclining position on the belts 42 and 67. As further means of assuring that the bottles reach a fully reclining position, a bridge 70 may be located to the right of the chute 38 so that all of the bottles will have to pass under the bridge and the only bottles that can do so will be those in a reclining position.

In order to ensure that the belts 42 and 67 operate above the level of the belt 43 by a specific amount, a shoe may be placed under them. The only shoe shown in the drawing is shoe 48 under the belt 42. The other shoe under the belt 67 is directly behind the shoe 48. These shoes also prevent the belts 42 and 67 from shifting up and down, or oscillating vertically as they travel around their drums, or pulleys.

The belt 42 travels around the pulleys 44 and 46 which are mounted on shafts 71 and 72. Pulley 44 turns freely on shaft 71 and pulley 46 is fixed on shaft 72. The shafts also support pulleys 73 and 74 for the middle belt 43, pulley 73 being fixed on shaft 71 and pulley 74 turning freely on shaft 72. Pulley 76 is free on shaft 71 and pulley 77 is fixed on shaft 72. One end of the shaft 71 is connected to a motor (not shown) while the other end has a gear 78 affixed to it to mesh to another gear 79 to which is attached a sprocket 81 that drives a chain 82. The chain 82 in turn is looped over another sprocket wheel 83 fixed on to the shaft 72 to turn the shaft 72 in the opposite direction from the shaft 71.

The middle belt 43 is driven in one direction by the shaft 71 and the outer two belts 42 and 67 are driven in the opposite direction by the other shaft 72. Either shaft may be used to drive the middle belt or the outer two belts but to give a specific example, in the embodiment shown, the pulley 73 that supports the middle belt 43 is keyed to the shaft 71 to rotate therewith in the direction of the arrow 84. The gears 78 and 79 reverse the direction of rotation and cause the chain 82 to move in the direction indicated by the arrow 85. This rotates the shaft 72 and the pulleys 46 and 77 in the direction of the arrow 86.

The key 87 is shown in FIG. 6, which also shows sleeve bearings 88 and 89 that support the pulleys 44 and 76, respectively. The outer pulleys 46 and 77 therefore must be keyed to the shaft 72 while the pulley 74 is separated from this shaft by a suitable bearing similar to the bearings 88 and 89.

The relative spacing between the belts is dependent on the shape of the bottles 33. As shown particularly in FIG. 6, the vertical spacing between the middle belt 43 and the outer belts 42 and 67 must be less than the height of the necks of the bottles so that a neck-down bottle will strike the middle belt 43 but the shoulder of that bottle will not strike the belts 42 or 67 until the bottle has been tilted as shown in FIG. 4. On the other hand, there must be a sufficient difference in the vertical positions of the middle belt 43 and the outer belts 42 and 67 so that, when the bottles are tilted over to rest upon the belts 42 and 67, they will not touch the middle belt 43. The lateral spacing between the belts also has a bearing upon the vertical separation, since the greater the lateral separation between the belts 42 and 67 for a bottle of a given diameter, the farther will that bottle settle down between the belts and therefore the greater will be the chances that it will come into contact with the middle belt 43 so as to be pulled in the wrong direction by frictional engagement with the middle belt while it is being pulled in the right direction by frictional engagement by the outer belts 42 and 67.

FIG. 7 shows another form of timing screw mechanism to erect the bottles to a filling position. As may be seen, the bottles 33 approach from the left and are carried along on the conveyor belt 52 in the direction of the arrow 91. Instead of a single timing screw 57, as described in connection with FIG. 1, FIG. 7 shows two timing screws 157 and 157a which are rotated in opposite directions by a motor (not shown). As the bottles 33 approach the timing screws, they are aligned end-to-end and the neck of each bottle faces in the opposite direction from the arrow 91. The spacing between the root diameters of the timing screws is approximately equal to, or slightly greater than, the diameter of each of the bottles 33. An almost helical thread 92 is formed upon the root diameter of the screw 157 and a similar thread 92a is formed upon the screw 157a and, as may be seen, the width of the outside diameters of the threads 92 and 92a on each of the screws 157 and 157a increases toward the right end of the screws. The distance along the root diameter between the forward surface 93 and the rear surface 94 of the thread 92 and the corresponding surfaces 93a and 94a of the thread 92a is approximately equal to the length of the main portion of each of the bottles 33 between the shoulder and the bottom of the bottle. As he bottle proceeds along the first few turns of the screws 157 and 157a, they are simply spaced apart but in the position indicated by the bottle 33f, the distance between the surfaces 93 and 94 and the surfaces 93a and 94a decreases and the outside diameter increases so that the bottle is forced to tilt toward an upright position. This manipulation of the bottle continues until, as indicated by the position of the bottle 33g, the bottle is completely upright, in which position it emerges from between the screws 157 and 157a and proceeds along the belt 52.

Figure 8:
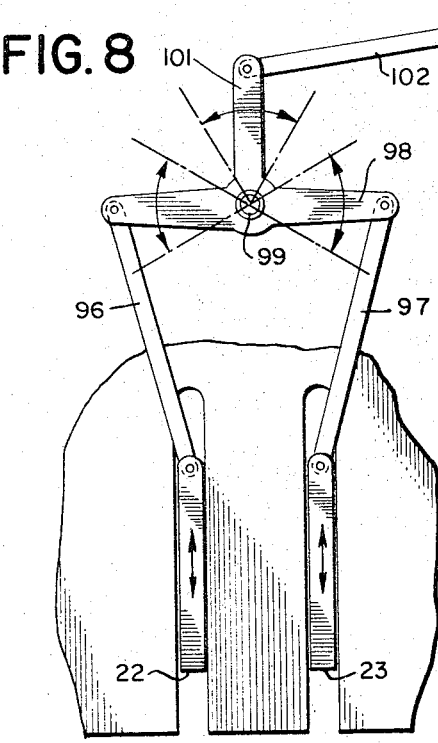
FIG. 8 shows a modified form of means for controlling the tumbling structures within the hopper shown in FIG. 2.

It is somewhat difficult to control the motion of the panels 22 and 23 so that they will move smoothly if they are lifted and lowered by air cylinders. Such cylinders tend to move abruptly. FIG. 8 shows a modification in which the panels 22 and 23 move continuously and smoothly. The panels 22 and 23 are connected, respectively, to rods 96 and 97 that are attached to opposite ends of a rocking arm 98 mounted on a pivot shaft 99 and provided with an upright arm 101 that is attached by a connecting rod 102 to a crank arm 103. The latter in turn is attached to a shaft 104 to be rotated continuously in the direction of the arrow 106 by a motor (not shown). This produces a harmonic motion of the panels 22 and 23 instead of the abrupt motion produced by an air cylinder.

Figure 9:
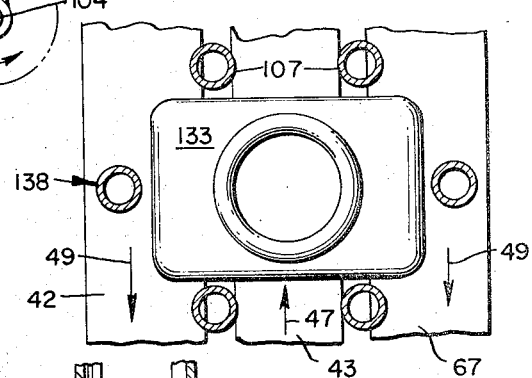
FIG. 9 shows a modification of the arrangement of the mechanism in FIG. 4 to accommodate bottles that have an elongated rather than a round cross-section.

FIG. 9 shows a modified chute 138 arranged to transport a bottle 133 of non-circular cross-section. In this case the bottle has a rectangular cross-section. The chute 138 in this embodiment is made up of six rods 107 spaced to conform with the rectangular cross-section of the bottle 133 although other forms of chute construction may be used as long as they properly constrain the bottles. In the case of a non-rectangular bottle, it is desirable to arrange the chute so that the bottle will strike the belts 42, 43 and 67 with an orientation that places the width of the bottle perpendicular to the direction of travel of the belts. This provides the greatest difference between the diameter of the neck of the bottle and the overall width of the main portion of the bottle and makes it much easier to control the final orientation than would be possible if the bottle struck the belts with an orientation that placed its width parallel to the direction of motion of the belts.

Figure 10:
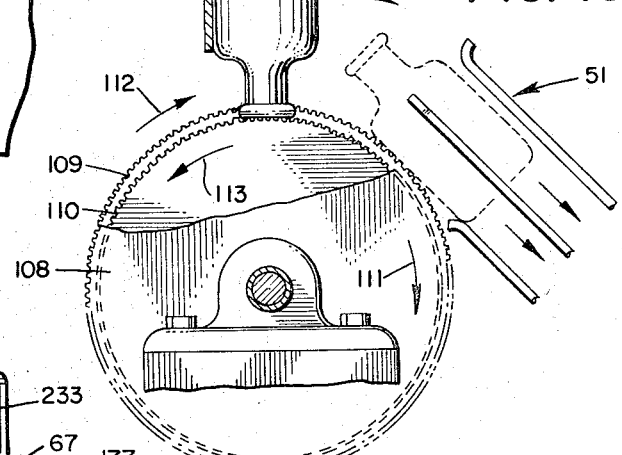
FIG. 10 shows a different embodiment of the apparatus in FIGS. 4–6.

Instead of belts, three wheels may be used, as shown in FIG. 10. The outer wheels, which correspond to the belts 42 and 67 in FIG. 4 are indicated by reference numerals 108 and 109, respectively, while the wheel that corresponds to the middle belt 43 is a wheel 110 of smaller diameter than the wheels 108 and 109. For greater friction between the bottles and the wheels, the surfaces of the wheels are roughened, which has been shown in FIG. 10 in somewhat exaggerated form.

Just as in the case of the belt machine of FIG. 4, the wheels 108 and 109 rotate in the same direction as indicated by the arrows 111 and 112, respectively while the middle wheel 110 rotates in the opposite direction, as indicated by the arrow 113 so that the bottles are tilted in the proper direction to head down the channel 51 with their necks facing opposite to the direction of motion.

Figure 11:
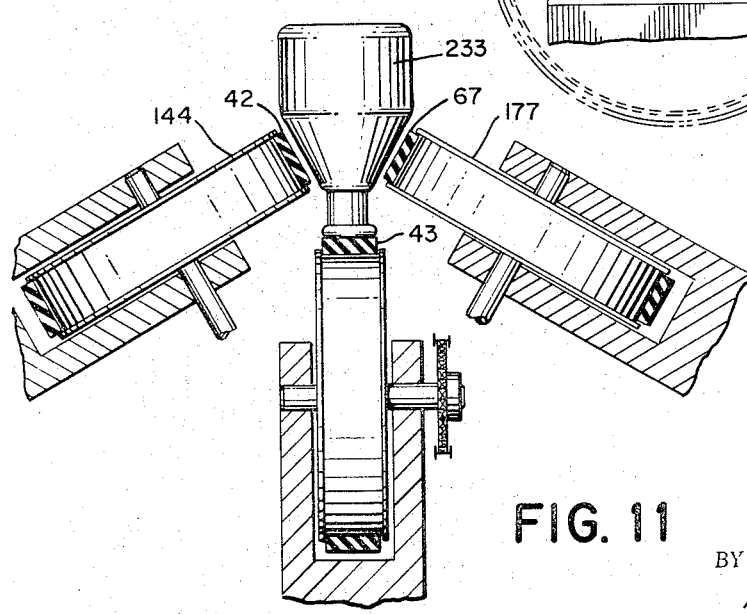
FIG. 11 shows still another form of apparatus similar to that in FIG. 4.

Another of the many possible modifications of the invention is shown in FIG. 11. This mechanism corresponds to that in FIGS. 4–6 but is particularly suited for bottles lacking a sharp differentiation between shaft width and neck width, such as tear-drop shape bottles. FIG. 11 shows a view of a machine corresponding to the cross-sectional view in FIG. 6 except that in FIG. 11 the side belts 42 and 67 are carried at an angle to the middle belt 43 and are supported on angularly disposed pulleys 144 and 177. However, the belts still move in the same relative direction as was described in the mechanism of FIGS. 4–6.

While the invention has been shown with a limited number of embodiments, it will be understood that the true scope of the invention is not limited thereto but is defined by the following claims.

What is claimed is:

1. Bottle orienting apparatus comprising: means forming a channel for the passage of bottles aligned vertically end to end and either neck up or neck down; a plurality of moving members, a central one of said members moving in one direction and side members spaced on each side of said central member moving in the opposite direction, said channel having its exit end adjacent to, and above, said moving members, said side members being at a higher level than said central member to engage outer portions of the bottoms of bottles that are neck up and move the bottoms of the bottles in said opposite direction thereby tipping the bottles backwardly into a lying position, said central member engaging the ends of the necks of bottles that are neck down to displace the neck portions of the neck down bottles in said one direction thereby tipping the bottles forwardly into a lying position, the said side members extending sufficiently far beyond the said exit end to engage the body portion of bottles tipped into lying position by said central member so as to carry said last named bottles away in said opposite direction.

2. Bottle orienting apparatus comprising: means forming a channel for the passage of bottles aligned vertically end to end and either neck up or neck down; a plurality of moving members, a central one of said members moving in one direction and side members spaced on each side of said central member moving in the opposite direction, said channel having its exit end above said moving members, said side members being at a higher level than said central member to engage outer portions of the bottoms of bottles that are neck up and move the bottoms of the bottles in said opposite direction thereby tipping the bottles backwardly, said central member engaging the ends of the necks of bottles that are neck down to displace the neck portions of the bottles in said one direction thereby tipping the bottles forwardly, and forward and rearward abutment means above said members, the forward abutment means being at a distance above the central member sufficiently great to clear the bottom of a bottle resting with its neck on the central member, but small enough to engage the neck of a bottle resting with its bottom on said side members, the rearward abutment means extending to a point sufficiently low above said central member to prevent rearward tipping of a bottle resting with its neck on said central member, rearward tipping being movement in said one direction of the bottom of a bottle resting with its neck on the central member.

3. Bottle orienting apparatus comprising: means forming a channel for the passage of bottles aligned vertically end to end and either neck up or neck down; a plurality of moving members including a central member moving in one direction and side members spaced on each side thereof moving in the opposite direction, said channel having its exit end adjacent to said moving members, said side members being at a higher level than said central member to engage outer portions of the bottoms of neck up bottles and move the bottoms in said opposite direction thereby tipping the bottles backwardly, the vertical distance between said side members and the edge of said exit end of said channel on the side toward which said side members move being less than the height of one of said bottles whereby said neck up bottles are retained by their necks to assist their backward tipping to a neck trailing position, said central member engaging the ends of the necks of said neck down bottles to displace the neck portions of said neck down bottles in said one direction thereby tipping the bottles forwardly, the edge of said exit end toward which the central member moves being vertically spaced from said side members by a distance less than the width of said bottles.

4. A device for orienting bottles supplied in random arrangement in which certain bottles move bottom leading and other bottles move neck leading, the device comprising, in combination, means for guiding the bottles along a substantially vertical path in a direction substantially in line with the bottle axes; stop means for arresting the vertical motion of the foremost bottle at the end of said path, said stop means comprising a pair of lateral elements spaced apart sufficiently far to permit the neck of a bottle arriving neck leading to enter therebetween, said pair of lateral elements providing lateral engagement surfaces spaced less than the bottle width and adapted to engage the bottom of a bottle arriving bottom leading at areas adjacent opposite end portions of the bottle bottom, and a further element providing a central engagement surface between and below said lateral surfaces for engaging the end of the neck of a bottle arriving neck leading; and drive means for driving said elements so as to move the lateral surfaces in one and the central surface in the opposite direction.

5. The device defined in claim 4 in which, in addition, an abutment means is provided for the foremost bottle, considering said bottle in the position in which the vertical movement is arrested by said stop means, said abutment means being forward of the bottle, as related to the direction of movement of said lateral surfaces, and at a vertical distance above the stop means sufficiently short to engage the neck of a bottle resting on said lateral surfaces so as to cause rearward tipping of the bottle, but sufficiently great to clear the bottom of a bottle resting with its neck end on said central surface and being tipped forward.

6. The device defined in claim 4 in which, in addition, a pair of abutment means is provided for the foremost bottle, considering said bottle in the position in which its vertical movement is arrested by said stop means, one abutment means being disposed forward of the bottle, the other abutment means being disposed behind the bottle, as related to the direction of movement of said lateral engagement surfaces, the forward element being at a vertical distance above said lateral surfaces less than bottle height and more than one-half of the bottle height, the rearward element being at a vertical distance above said lateral surfaces less than one-half of the bottle height, said abutment means being sufficiently close to the bottle in said position to tip the bottle when the lower end of the bottle is displaced by said stop means.

7. The device defined in claim 4 in which a carry-out conveyor is provided in line with said lateral engagement surfaces to receive bottles therefrom.

8. The device defined in claim 4 in which said further element and said lateral elements are individual wheels.

9. The device defined in claim 4 in which said further element and said lateral elements are endless belts.

10. The device defined in claim 4 in which said further element and said lateral elements are endless belts, the engagement surface of said lateral belts being inclined with respect to the engagement surface of the belt providing the central engagement surface.

References Cited

UNITED STATES PATENTS 3,100,562   8/1963   Whelan _____ 198—33

EVON C. BLUNK, *Primary Examiner.*

RICHARD E. AEGERTER, *Examiner.*